United States Patent [19]

Hoppie et al.

[11] 4,333,553

[45] Jun. 8, 1982

[54] PRESTRESSED ELASTOMER FOR ENERGY STORAGE

[75] Inventors: Lyle O. Hoppie, Birmingham; Donald Speranza, Canton, both of Mich.

[73] Assignee: Eaton Corporation, Cleveland, Ohio

[21] Appl. No.: 184,880

[22] Filed: Sep. 8, 1980

[51] Int. Cl.³ .................... F16D 67/02; B60K 41/24
[52] U.S. Cl. ............................... 192/4 A; 180/165; 185/9; 185/37
[58] Field of Search ............ 180/165, 54 R; 60/699; 192/1, 4 A; 188/268; 185/37, 39, 40 R, 40 H, 9, 10, 11, DIG. 1

[56] References Cited

U.S. PATENT DOCUMENTS

| | | | |
|---|---|---|---|
| 1,030,051 | 6/1912 | Brundege . | |
| 2,137,574 | 11/1938 | Kromer | 180/1 |
| 3,126,070 | 3/1964 | Hayek | 185/37 |
| 3,945,453 | 3/1976 | Black | 180/54 R |
| 4,159,042 | 6/1979 | Jayner | 180/54 R |
| 4,246,988 | 1/1981 | Hoppie | 185/40 H X |
| 4,305,489 | 12/1981 | Hoppie | 192/0.094 X |

OTHER PUBLICATIONS

"Mechanical Energy Storage Technology Project, Annual Report 1978", Barlow et al., May 26, 1979, pp. 15-17, Univ. of Calif. Lawrence Livermore Laboratory.

Primary Examiner—Rodney H. Bonck
Attorney, Agent, or Firm—C. H. Grace; P. S. Rulon

[57] ABSTRACT

Disclosed is a regenerative braking device for an automotive vehicle. The device includes a power isolating assembly (14), an infinitely variable transmission (20) interconnecting an input shaft (16) with an output shaft (18), and an energy storage assembly (22). The storage assembly includes a plurality of elastomeric rods (44, 46) mounted for rotation and connected in series between the input and output shafts. The elastomeric rods are prestressed along their rotational or longitudinal axes to inhibit buckling of the rods due to torsional stressing of the rods in response to relative rotation of the input and output shafts.

17 Claims, 2 Drawing Figures

PRESTRESSED ELASTOMER FOR ENERGY STORAGE

GOVERNMENT RIGHTS STATEMENT

The Government has rights in this invention pursuant to Contract W-7405-ENG-48 awarded by the U.S. Department of Energy and Subcontract 2617509 awarded by The University of California Lawrence Livermore Laboratory.

CROSS-REFERENCE TO RELATED APPLICATIONS

This application is related to U.S. patent application Ser. No. 944,442, filed Sept. 21, 1978, now U.S. Pat. No. 4,246,988; 095,901, filed Nov. 19, 1979, now U.S. Pat. No. 4,310,079; 100,783, filed Dec. 5, 1979, now U.S. Pat. No. 4,305,489; and 102,696, filed Dec. 5, 1979. All of these applications are assigned to the assignee of this application.

FIELD OF THE INVENTION

This invention relates to regenerative braking and more specifically to regenerative braking of an automotive vehicle.

BACKGROUND OF THE INVENTION

Energy storage devices have been recognized as having the potential to decrease the energy consumption in a host of mobile and stationary applications. In land vehicles, for example, energy storage devices can be used as part of a regenerative braking system in order to capture and subsequently reuse vehicle kinetic energy which would otherwise be dissipated as heat in the vehicle brakes each time the vehicle decelerates. Energy storage devices cannot only reclaim vehicle kinetic energy during deceleration or braking and therefore reduce energy or fuel consumption of a given vehicle with a given primemover, they can further permit downsizing of primemovers to a more energy or fuel efficient size since horsepower for acceleration, passing, and/or hill-climbing can, for the most part, be provided by the energy storage device.

Many automotive regenerative braking devices have been proposed with little or no success. The devices have been inefficient, bulky, heavy, and/or not readily controllable. For example, regenerative braking devices using flywheels or pressurized fluid have been inefficient, i.e., the round-trip energy transfer efficiency of these devices has been relatively low. Devices using resilient means, such as metal springs, have been bulky and/or heavy; further, the driving and braking torques of such devices have not been readily controllable.

The copending U.S. Patent Applications mentioned in the above Cross-Reference all disclose regenerative braking devices employing elastomers for storing energy. The elastomer may be in the form of elastomeric rods. To store energy, one end of each rod is rotated relative to the other end, thereby torsionally stressing the rod about its longitudinal axis. In laboratory tests of elastomeric rods, plotting torque versus the number of rotational turns of one end of a rod relative to its other end, the torque increased with increasing relative rotation until the rod buckled and then began to form knots similar to the knots formed by rubber bands in model airplanes. When the rods buckled, the torque dipped and then continued to increase at a lesser rate. This lesser rate of torque increasing is advantageous in that greater amounts of energy may be stored in the elastomer at lower torque levels. However, the knotting causes the rods to abrade. The abrasion did not manifest itself as an excessive friction loss but did cause tears to develop in the elastomer, thereby severely reducing the fatigue life of the elastomer.

SUMMARY OF THE INVENTION

An object of this invention is to improve the fatigue life of an energy storage elastomer in an elastomeric energy storage device.

Another object of this invention is to improve the energy density, fatigue life, and efficiency of an energy storage elastomer in an energy storage device.

According to a feature of the invention, an energy storage device includes shaft means mounted for rotation and adapted for driving connection to a drivetrain of a machine to effect an energy transfer between the drivetrain and the device, an elastomeric rod having first and second ends, means mounting the rod for rotation of one of its ends relative to the other end in response to rotation of the shaft means, and means prestressing the rod in the direction of its longitudinal axis independent of the torsional stressing, thereby inhibiting buckling of the rod due to torsional stressing.

BRIEF DESCRIPTION OF THE DRAWINGS

The energy storage device of the present invention is shown in the accompanying drawing in which.

Figure 1:
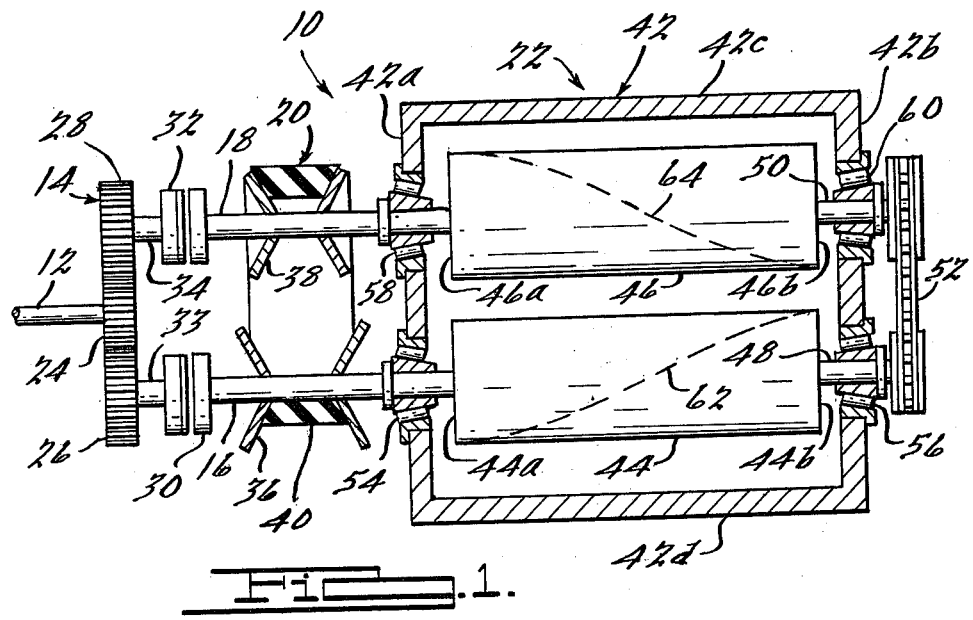
FIG. 1 is a schematic of the invention device.

Certain terminology referring to the proposed environment of the device, direction, and motion of components in the device will be used in the following description. This terminology is for convenience in describing the disclosed embodiments and shall not be considered limiting unless explicitly used in the appended claims.

DETAILED DESCRIPTION OF THE DRAWING

Referring now to FIG. 1, therein is shown a regenerative braking device 10 including a partially shown input/output shaft 12, a power isolating assembly 14, an input shaft 16, an output shaft 18, a variable ratio transmission 20, and an energy storage assembly 22. Shaft 12 is adapted for connection at its left end to an unshown drivetrain of a vehicle or a mass having variable kinetic energy. The other end of shaft 12 is fixed directly to a gear 24 of the power isolating assembly.

The power isolating assembly 14 includes the gear 24, gears 26 and 28 in mesh with gear 24, clutches 30 and 32, and shafts 33 and 34 respectvely connecting one side of the clutches with gears 26 and 28. Clutches 30 and 32 may be conventional friction clutches and gears 26 and 28 are preferably, but not necessarily of the same size. During a vehicle braking mode of operation clutch 30 is applied and clutch 32 is released, thereby connecting the vehicle drivetrain with input shaft 16. During a vehicle acceleration mode of operation, clutch 32 is applied and clutch 30 is released, thereby connecting output shaft 18 with the vehicle drivetrain.

Variable ratio transmission 20 includes variable diameter sheaves or pulleys 36 and 38 respectively fixed for rotation with shafts 16 and 18 and a continuous V-belt 40. Transmission 20 is a well-known species of transmissions which are known as continuously variable transmissions. Transmission 20 may be any of several types of continuously variable transmissions or, as disclosed in copending application Ser. No. 095,901, a discrete or step ratio transmission. The diameters of pulleys 36 and 38 are readily varied by moving one or both of the halves of one pulley together while separating the halves of the other pulley. When the pulley diameters are the same, no energy flows between the vehicle drivetrain and the energy storage assembly 22.

Energy storage assembly 22 includes a housing or frame 42 having left and right end walls 42a and 42b and side walls 42c and 42d rigidly spacing the end walls apart, a plurality of rubber or elastomeric rods 44 and 46 respectively fixed at their left ends 44a and 46a to input and output shafts 16 and 18 and respectively fixed at their right ends to shafts 48 and 50, and a continuous belt or chain 52 drivingly interconnecting shafts 48 and 50 with a one-to-one speed ratio. Shafts 16 and 48, and shafts 18 and 50 are coaxially mounted in tapered roller bearings 54 and 56, 58, and 60 which space the respective shafts apart a distance greater than the free or unstretched longitudinal lengths of the elastomeric rods. The rods are stretched or prestressed along the longitudinal axes to prevent buckling of the rods when the rods are torsionally stressed to store energy therein during vehicle braking. The rods are twisted or torsionally stressed to accumulate energy when input shaft 16 rotates faster than output shaft 18. The rods are torsionally unstressed or relaxed to deliver stored or accumulated energy when output shaft 18 rotates faster than input shaft 16.

Elastomeric rods 44 and 46 are shown connected in series between input and output shafts 16 and 18. However, the rods can be connected in parallel. Further, the rods need not be mounted for rotation at both of the ends as shown herein, e.g., the rods may be fixed or grounded at one end and connected at the other end to rotatable shafts, as disclosed in copending application Ser. No. 944,442.

Figure 2:
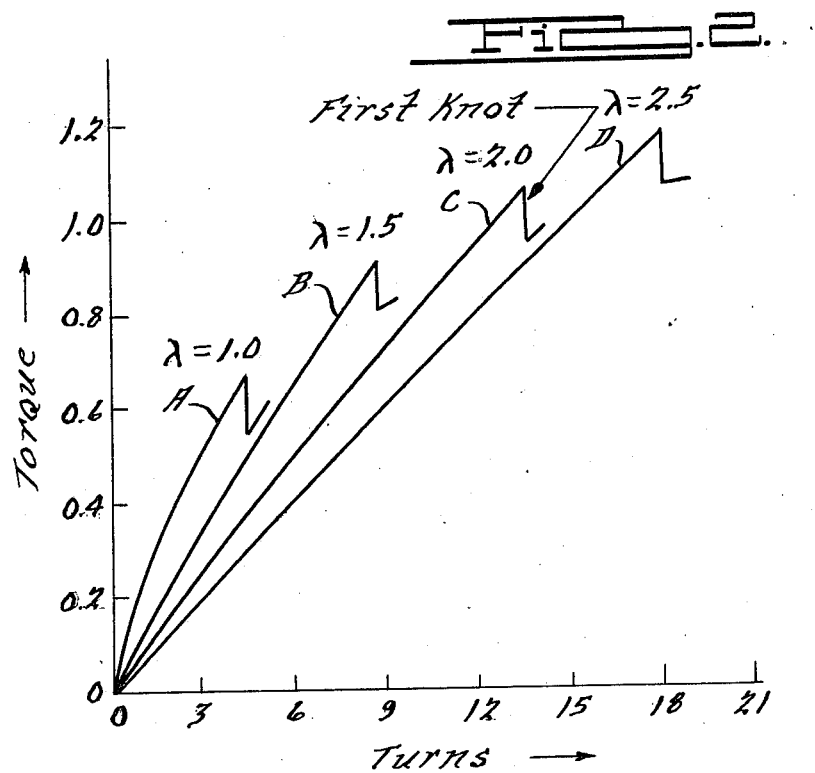
FIG. 2 is a graph showing the effect of axial elongation on an elastomeric rod.

Looking now at the graph of FIG. 2, the four curves A, B, C, and D therein are plots of torque versus relative turns of the ends of a small scale elastomeric rod which was prestressed or elongated different amounts and then turned until the rod buckled. The elongation, represented herein by the symbol $\lambda$, is the ratio of the final or stretched length of the rod to the initial or unstretched length of the rod. Hence, for curve A the rod is unstretched, since the final and initial lengths must be the same for $\lambda = 1$. The distinct dip in each of the curves is the point at which the rod buckled and began to form knots similar to the knots formed by a rubber band in a model airplane. As previously mentioned in the Background Of The Invention, abrasion caused by the knots tears the elastomer, thereby severely reducing the fatigue life of the elastomer. The plots dramatically illustrate the effect of axially prestressing the elastomeric rod on energy density prior to the first knot since the area under each of the curves prior to the dip in each of the curves represents the energy stored in the elastomeric rod prior to the first knot. Hence, the prestressing allows greater amounts of torsional energy to be stored in a given rod without the rod buckling.

Thinking now in terms of the regenerative braking device 10 installed in a vehicle, when the diameters of pulleys 36 and 38 are the same, both ends of the elastomeric rods turn at the same speed. Hence, no energy in the form of torsional stress flows into or out of the energy storage assembly. During steady state operation of the vehicle, clutches 30 and 32 are preferably unapplied and pulleys 36 and 38 are preferably positioned to have equal diameters so that the clutch 30 may be applied without load when a vehicle braking or acceleration mode of operation is initiated. When a deceleration mode is initiated, clutch 30 is applied and the diameter of pulley 36 is made smaller than the diameter of pulley 38, whereby input shaft 16 rotates faster than output shaft 18. This difference in speed between the input and output shafts torsionally stresses or twists the elastomeric rods about their longitudinal axes in the direction of phantom lines 62 and 64 to effect a delivery of energy from the vehicle drivetrain to the energy storage assembly, thereby slowing or braking the vehicle as energy is accumulated in the energy storage assembly. For a given rotational speed of shaft 12, deceleration of the vehicle may be increased by further decreasing the diameter of pulley 36 relative to pulley 38; deceleration may be decreased by bringing the pulley diameters closer to a one-to-one ratio. When acceleration of the vehicle is desired, clutch 30 is disengaged, clutch 32 is applied, and the diameter of pulley 38 is made smaller than the diameter of pulley 36, whereby output shaft 18 rotates faster than input shaft 16. This difference in speed of the input and output shafts torsionally relaxes the elastomeric rods to effect a delivery of accumulated energy back to the vehicle drivetrain, thereby providing power for vehicle acceleration, hill-climbing, and/or passing. For a given rotational speed of shaft 12 acceleration of the vehicle may be increased by further decreasing the diameter of pulley 38 relative to pulley 36 and acceleration may be decreased by bringing the diameter closer to a one-to-one speed ratio.

Thinking now in terms of power rather than just energy, regenerative braking device 10 is a power-splitting energy transfer device which can circulate energy from the storage assembly output at shaft 18 back to the storage assembly input at shaft 16. More specifically, since torque is uniform throughout energy storage assembly 22, the torques on shafts 16 and 18 between the variable ratio transmission 20 and the elastomeric rods 44 and 46 are the same. Hence, the ratio of power flowing into the elastomeric rods along shaft 16 and out of the elastomeric rods along shaft 18 is equal to the speed ratio of the shafts 16 and 18. For example, during vehicle deceleration when the input shaft rotates four times faster than the output shaft, a four-to-one speed ratio, three units of power flow from shaft 12 into input shaft 16 via gears 24 and 26 and clutch 30, and one unit of power flows from output shaft 18 into input shaft 16 via transmission 20. Hence, during vehicle deceleration transmission 20 never carries more than a fraction of the power being absorbed by the elastomeric rods. During vehicle acceleration, when output shaft 18 rotates four times faster than input shaft 16, again a four-to-one speed ratio, four units of power flow from the elastomeric rods into output shaft 18. Three of the four units of power flow to the vehicle via clutch 32 and gears 28 and 24 and one of the four units flows back into the elastomeric rods via transmission 20 and input shaft 16. Hence, during acceleration transmission 20 never carries more than a fraction of the power delivered to the vehicle.

If the power being handled by transmission 20 is of no concern, the gears and output clutch of power isolating assembly 14 may be dispensed with and shaft 12 may be connected directly to clutch 30. Clutch 30 then becomes both the input and output clutch. Such a modification will not affect the power handling by the transmission during vehicle deceleration. However, during acceleration, with the four-to-one ratio example, all four units of power will flow from the output shaft via the transmission to the input shaft; at the input shaft the power splits, three of the four units flow out to the vehicle via clutch 30 and one of the four units flows back to the elastomeric rods. Hence, without the power isolating assembly transmission 20 handles more power than is actually being delivered to the vehicle during acceleration.

One embodiment of the invention has been disclosed herein for illustrative purposes. Many variations and modifications of the disclosed embodiment are believed to be within the spirit of the invention. For example, any of the devices disclosed in the patent applications mentioned herein may incorporate the prestressing concept of this application. The following claims are intended to cover the inventive portions of this invention and variations and modifications within the spirit of the invention.

What is claimed is:

1. An energy storage device comprising:
a shaft means mounted for rotation;
an elastomeric rod having a longitudinal axis and first and second ends lying along the axis;
means mounting said rod for rotation of said first end relative to said second end in response to rotation of said shaft means, thereby torsionally stressing the rod about said axis; and
means prestressing the rod in the direction of the longitudinal axis independent of said torsional stressing.

2. An energy storage device comprising:
a shaft means mounted for rotation;
an elastomeric rod having a longitudinal axis and first and second ends lying along the axis;
means mounting said rod for rotation of said first end relative to said second end in response to rotation of said shaft means, thereby torsionally stressing the rod about said axis; and
means elongating said rod in the direction of said longitudinal axis to inhibit buckling of said rod in response to said torsional stressing.

3. The device of claims 1, or 2 wherein said shaft means includes an input shaft and an output shaft and further including:
a variable ratio transmission drivingly interconnecting said input and output shafts for effecting relative rotation of said rod ends.

4. An energy storage device comprising:
an input shaft and an output shaft mounted for relative rotation;
a plurality of elastomeric rods each having a longitudinal axis and each having first and second ends;
means mounting said rods for rotation of said first ends relative to said second ends in response to relative rotation of said shaft for torsionally stressing and unstressing said rods about said axis; and
means prestressing said rods along said axes independent of said torsional stressing.

5. An energy storage device comprising:
an input shaft and an output shaft mounted for relative rotation;
a plurality of elastomeric rods each having a longitudinal axis and each having first and second ends;
means mounting said rods for rotation of said first ends relative to said second ends in response to relative rotation of said shafts for torsionally stressing and unstressing said rods about said axes; and
means elongating said rods in the direction of said longitudinal axes to inhibit buckling of said rods in response to said torsional stressing.

6. The device of claims 4 or 5, wherein said rods are connected in series.

7. The device of claim 6, further including:
a variable ratio transmission drivingly interconnecting said shafts for effecting said relative rotation of said shafts.

8. The device of claim 7, including at least two rods with said first end of one of said rods fixed to said input shaft and said second end of the other rod fixed to said output shaft.

9. The device of claims 4 or 5, further including:
a variable ratio transmission drivingly interconnecting said shafts for effecting said relative rotation of said shafts.

10. The device of claims 4 or 5, wherein said first and second ends of said rods are mounted for rotation and further including:
a variable ratio transmission drivingly interconnecting said shafts for effecting said relative rotation of said shafts.

11. A regenerative braking device adapted to be connected to a drivetrain of a vehicle, said device comprising:
an input shaft and an output shaft mounted for relative rotation;
at least one elastomeric rod having a longitudinal axis and first and second ends;
means mounting said rod for rotation of said first end relative to said second end in response to said relative rotation of said shaft;
means selectively operative to effect said relative shaft rotation in one sense to torsionally stress said rod for transferring energy from the drivetrain to said rod via said input shaft and selectively operative to effect said relative shaft rotation in the opposite sense to torsionally unstress said rod for transferring energy from said rod to the drivetrain via said output shaft; and
means prestressing said rod along said axis independent of said torsional stressing.

12. A regenerative braking device adapted to be connected to a drivetrain of a vehicle, said device comprising:
an input shaft and an output shaft mounted for relative rotation;
at least one elastomeric rod having a longitudinal axis and first and second ends;
means mounting said rod for rotation of said first end relative to said second end in response to said relative rotation of said shaft;
means selectively operative to effect said relative shaft rotation in one sense to torsionally stress said rod for transferring energy from the drivetrain to said rod via said input shaft and selectively operative to effect said relative shaft rotation in the opposite sense to torsionally unstress said rod for transferring energy from said rod to the drivetrain via said output shaft; and
means elongating said rod in the direction of said longitudinal axis to inhibit buckling of said rod in response to said torsional stressing.

13. A regenerative braking device adapted to be connected to a drivetrain of a vehicle, said device comprising:
- a plurality of elastomeric rods each having a longitudinal axis and first and second ends;
- means mounting each rod for rotation about its axis;
- an input shaft mounted for rotation and drivingly connected to at least one of said first ends of one of said rods;
- an output shaft mounted for rotation relative to said input shaft and drivingly connected to at least one of said second ends of one of said rods;
- means selectively operative to effect said relative shaft rotation in one sense to torsionally stress said rods for transferring energy from the drivetrain via said input shaft to said rods and selectively operative to effect said relative shaft rotation in the opposite sense to torsionally unstress said rods for transferring energy from said rods to the drivetrain via said output shaft; and
- means prestressing each of said rods along its axis independent of said torsional stressing.

14. A regenerative braking device adapted to be connected to a drivetrain of a vehicle, said device comprising:
- a plurality of elastomeric rods each having a longitudinal axis and first and second ends;
- means mounting each rod for rotation about its axis;
- an input shaft mounted for rotation and drivingly connected to at least one of said first ends of one of said rods;
- an output shaft mounted for rotation relative to said input shaft and drivingly connected to at least one of said second ends of one of said rods;
- Means selectively operative to effect said relative shaft rotation in one sense to torsionally stress said rods for transferring energy from the drivetrain via said input shaft to said rods and selectively operative to effect said relative shaft rotation in the opposite sense to torsionally unstress said rods for transferring energy from said rods to the drivetrain via said output shaft; and
- means elongating said rods in the direction of said longitudinal axes to inhibit buckling of said rods in response to said torsional stressing.

15. The device of claim 14, wherein said elastomeric rods are connected in series between said input and output shafts.

16. The device of claims 11, 12, 13, or 14, further including:
- a variable ratio transmission drivingly interconnecting said shafts for effecting said relative rotation of said shafts.

17. The device of claims 11, 12, 13, or 14, wherein said first and second ends of each rod are mounted for rotation and further including:
- a variable ratio transmission drivingly interconnecting said shafts for effecting said relative rotation of said shafts.

* * * * *